UNITED STATES PATENT OFFICE.

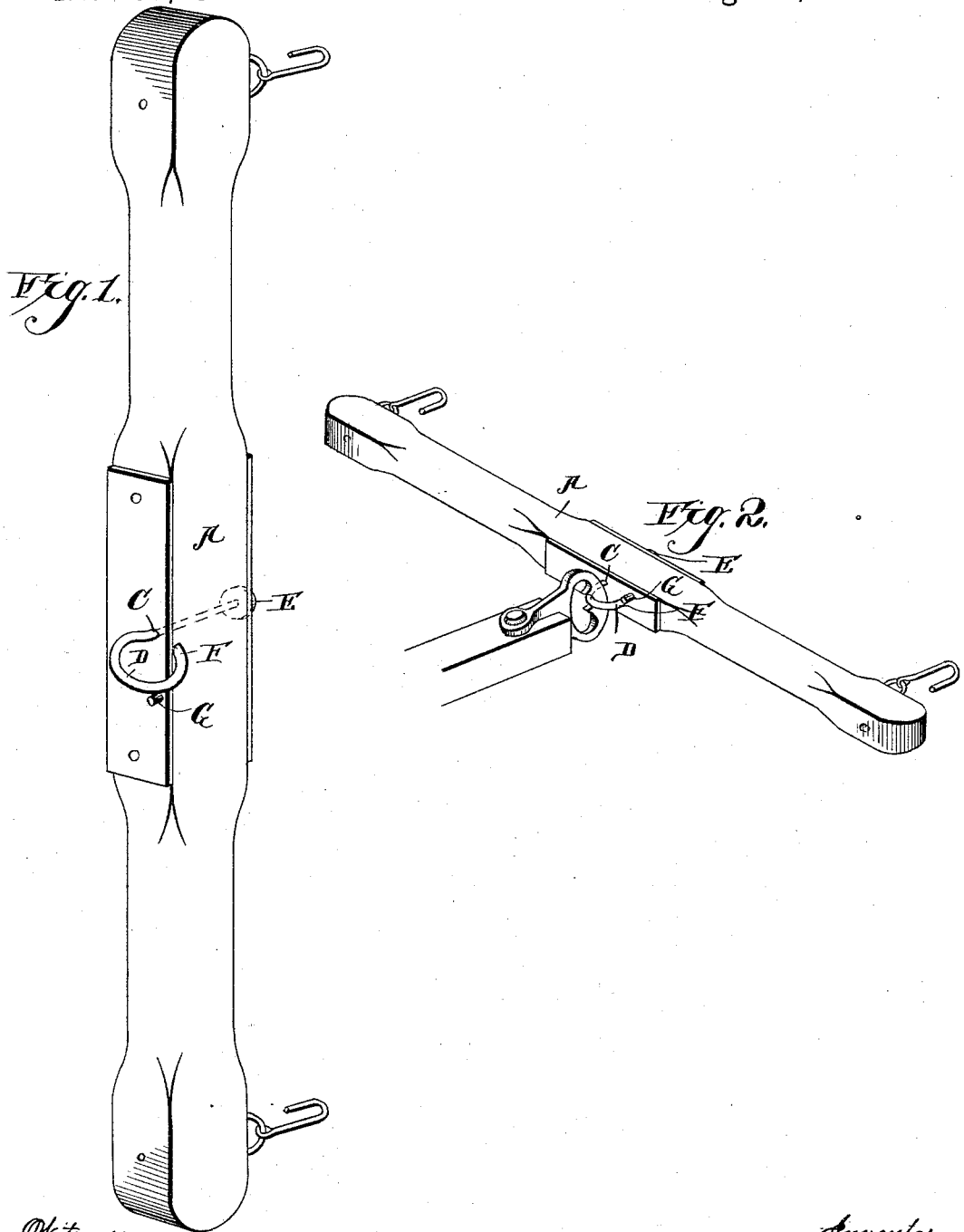

MURDOCK M. McKINNON, OF LAURINBURG, NORTH CAROLINA.

WHIFFLETREE.

SPECIFICATION forming part of Letters Patent No. 409,798, dated August 27, 1889.

Application filed April 11, 1889. Serial No. 306,831. (No model.)

*To all whom it may concern:*

Be it known that I, MURDOCK M. MCKINNON, a citizen of the United States, residing at Laurinburg, in the county of Richmond and State of North Carolina, have invented a new and useful Whiffletree, of which the following is a specification.

My invention relates to improvements in whiffletrees; and it consists in certain novel features hereinafter described and claimed.

In the accompanying drawings, Figure 1 is a perspective view showing the device arranged in position to be attached to a plow-beam or to a wagon. Fig. 2 is a similar view showing it applied.

The whiffletree-bar A may be of any desired material, and is provided at its center near its upper side with a transverse perforation C, in which the attaching-hook D is loosely mounted. The said hook is prevented from being withdrawn from the said opening, and so being detached from the whiffletree-bar, by a washer or annular flange E at its front end, as shown. The rear end of the hook forms a divided ring F, which is adapted to engage the clevis or a hook or ring on the plow-beam or the wagon, as will be readily understood. A stud G is formed on the rear side of the whiffletree adjacent to the hood D, for a purpose which will be presently set forth.

When it is desired to attach the whiffletree to a plow or to a wagon, the whiffletree is held in a vertical position, while the hook is arranged in a horizontal position, as clearly shown in Fig. 1. The hook is then engaged in the clevis or in a ring on the wagon, and the whiffletree-bar is then turned through three-quarters of a complete revolution, when the stud G will be brought into position above and bearing on the free end of the divided ring F, as shown in Fig. 2. In this position the whiffletree will be securely attached to the plow or the vehicle which it is desired to have drawn.

It will be readily seen that I have provided a whiffletree which is very simple and by the use of which the use of lap-rings and the removal of the clevis is entirely obviated. The whiffletree can be quickly applied, and when applied will be securely held, as the stud on the rear side of the whiffletree effectually prevents the hook from being disengaged from the clevis or the lap-ring, and the traces attached to the ends of the whiffletree-bar prevent the said bar rotating, so as to disengage the hook and the clevis. The transverse opening being formed through the whiffletree-bar, near the top of the same, the hook will be secured in the bar in such a position that when the parts are arranged as shown in Fig. 1 the opening in the divided ring will be beyond the side or top of the bar, so that the ring can be quickly and easily engaged in the clevis without loosening the nut; but when turned to the position shown in Fig. 2 the division of the ring will be completely covered by the whiffletree-bar, so as to prevent the clevis slipping from the hook.

Having thus described my invention, what I claim, and desire to secure by Letters Patent, is—

The improved whiffletree consisting of the whiffletree-bar having a transverse opening at its center near one side, a hook loosely mounted in said opening and having a divided ring at its rear end, and a stud projecting from the rear side of the whiffletree-bar adjacent to the transverse opening therein and adapted to contact with the free end of the divided ring, as set forth.

In testimony that I claim the foregoing as my own I have hereto affixed my signature in presence of two witnesses.

MURDOCK M. MCKINNON.

Witnesses:
C. H. COBLE,
C. MCKINNON.